United States Patent
Bulriss et al.

(10) Patent No.: US 7,061,521 B2
(45) Date of Patent: Jun. 13, 2006

(54) VIDEO CONFERENCE SYSTEM PROVIDING PRIVATE AND ATTORNEY-CLIENT PRIVILEGED COMMUNICATIONS

(75) Inventors: Michael E Bulriss, San Antonio, TX (US); James F Franz, San Antonio, TX (US)

(73) Assignee: Vugate Inc., San Antonio, TX (US)

( * ) Notice: Subject to any disclaimer, the term of this patent is extended or adjusted under 35 U.S.C. 154(b) by 166 days.

(21) Appl. No.: 10/735,849

(22) Filed: Dec. 16, 2003

(65) Prior Publication Data

US 2005/0128283 A1 Jun. 16, 2005

(51) Int. Cl.
H04N 7/14 (2006.01)

(52) U.S. Cl. .................. 348/14.08; 348/14.09; 348/14.12

(58) Field of Classification Search ............. 348/14.01, 348/14.09, 14.1, 14.11, 14.12, 14.3; 370/260, 370/261; 279/202.01

See application file for complete search history.

(56) References Cited

U.S. PATENT DOCUMENTS

| | | |
|---|---|---|
| 4,710,917 A | 12/1987 | Tompkins et al. |
| 4,716,585 A | 12/1987 | Tompkins et al. |
| 4,847,829 A | 7/1989 | Tompkins et al. |
| 4,965,819 A | 10/1990 | Kannes |
| 5,014,267 A | 5/1991 | Tompkins et al. |
| 5,382,972 A | 1/1995 | Kannes |
| 5,625,407 A | 4/1997 | Biggs et al. |
| 5,903,302 A | 5/1999 | Browning et al. |
| 5,963,246 A | 10/1999 | Kato |
| 6,020,916 A | 2/2000 | Gerszberg et al. |
| 6,185,285 B1 | 2/2001 | Relyea et al. |
| 6,205,716 B1 | 3/2001 | Peltz |
| 6,236,854 B1 | 5/2001 | Bradshaw, Jr. |
| 6,343,314 B1 | 1/2002 | Ludwig et al. |
| 6,608,820 B1 | 8/2003 | Bradshaw, Jr. |
| 6,621,514 B1 | 9/2003 | Hamilton |
| 2002/0129112 A1 | 9/2002 | Maehiro |
| 2003/0174826 A1 | 9/2003 | Hesse |

FOREIGN PATENT DOCUMENTS

GB 2278516 A * 11/1994

* cited by examiner

Primary Examiner—Melur Ramakrishnaiah
(74) Attorney, Agent, or Firm—Pillsbury Winthrop Shaw Pittman LLP

(57) ABSTRACT

A conference system includes a first conference station generating at least one of audio and video signals from at least an attorney and a second conference station generating at least one of audio and video signals from the attorney's client, the attorney and the attorney's client having a relationship protected by the attorney-client privilege. The system also includes at least one communications link connecting the first and second conference stations that carries the audio and/or video signals between the first and second conference stations. A signal processor is disposed within the communications link between the first and second conference stations to route signals between the first and second conference stations. At least one control panel communicates with the signal processor and provides control over audio and/or video signals so that the attorney and the attorney's client are permitted to engage in a private communication without vitiating the attorney-client privilege.

23 Claims, 11 Drawing Sheets

VIDEO CONFERENCE SYSTEM PROVIDING PRIVATE AND ATTORNEY-CLIENT PRIVILEGED COMMUNICATIONS

BACKGROUND OF THE INVENTION

1. Field of the Invention

The present invention concerns, among other aspects, a video conferencing system connecting a courtroom with a jail. The system enables private communication between an attorney and his incarcerated client during trial such that the private communication is maintained in confidence and, therefore, does not lose its protected status under the legal doctrine of the attorney-client privilege.

2. Description of the Related Art

The concept of video conferencing is not a new one. Numerous video conferencing systems are known to those skilled in the art, including the systems described in U.S. Pat. Nos. 4,710,917, 4,716,585, 4,847,829, 5,014,267, and 5,903,302, for example, the contents of each of which are incorporated herein by reference.

In recent years, to capitalizes on the improved safety and convenience offered by video conferencing systems, among other advantages, courts have begun to rely on video conferencing systems that facilitate communication between courthouses and jails. In particular, within the last decade, courts have relied increasingly on video conferencing systems for inmate arraignment proceedings. Arraignment proceedings typically involve the judge, a court reporter, a clerk and the inmate and are often conducted outside of the presence of attorneys. At an arraignment hearing, the judge reads the charges being brought against the defendant, who also may be referred to as the inmate, the incarcerated, or the criminal.

Video conferencing has become a generally acceptable vehicle through which an arraignment hearing may be conducted because video arraignment offers a number of advantages over the traditional system. Before the advent of video arraignment, the inmate had to be transported from the prison to the courthouse so that the charges could be read to the inmate in person. The cost of transporting inmates from the prison to the courthouse and back is not insignificant. Not only is there a cost associated with the actual transportation itself, but the cost associated with the personnel required to provide adequate security is substantial.

If the inmate does not have to be transported from the prison, the cost to the federal, state, or local government entity may be significantly reduced because transportation and security costs associated with the arraignment hearing may be eliminated. In addition, the overall security at the courthouse may be increased, primarily due to the elimination of the presence of the inmate at the courthouse. In addition, in some circumstances, especially where the case is a particularly high-profile one, the threat of protest or terrorist activity against the courthouse may be reduced because the inmate remains in the jail and does not create a focal point of such activity while in the courthouse.

A more recent trend in the last ten years, which also capitalizes on the advantages offered by video conferencing, has been the development and implementation of video conferencing facilities to permit prison inmates to visit with family members and friends. Such visitation systems include (1) a visitor center, remotely located from the prison, connected to (2) an inmate center, located within the prison. The visitor center and the prison are connected to one another via the video conference system so that prisoners and visitors may engage in face-to-face discussions. In lieu of a personal visit, video conferencing offers a more personal connection between prisoners and visitors than does a telephone communication.

The advantages of a video conference system in a prison setting are many-fold. Specifically, because the visitor's center may be located remotely from the prison, visitors are not required to travel to the prison to speak with inmates. As a result, convenience to the visitor is greatly enhanced. To further facilitate visitation, prisons may set up visitor centers in urban locations, closer to the homes of potential visitors, which makes inmate visitation even more convenient.

In addition, removing the visitor's center from the prison greatly improves security at prisons for several reasons. First, visitors often bring gifts to prisoners, which they present to the inmates during the visitation. In some instances, the visitors bring items that have been classified as "contraband" because the items may be fashioned into a weapon. Second, the safety of the visitor is increased because the visitor does not need to enter the prison environment.

Most recently, especially since the tragedy of Sep. 11$^{th}$, 2001, security issues at government buildings, including courthouses, has become an increasingly important concern. In particular, courts have begun to look at additional ways in which security may be enhanced and risk may be reduced. One avenue explored most recently by courts (i.e., more recently than the consideration of inmate visitation using video conferencing) has been the use of video conferencing to assist in conducting criminal trials. With such systems, inmates are kept in the jail and participate in their trials via video conferencing.

One drawback to the use of video conferencing has been a difficulty encountered when the defense attorney finds it necessary to confer with the inmate (the defense attorney's client) to discuss a particular issue during the course of the trial. In courts where video conferencing is employed, to facilitate a private conference between an attorney and an inmate, it has been necessary to establish a separate telephone connection between the defense attorney and the inmate in the prison. Typically, this has been accomplished by taking a recess during the trial and permitting the attorney to establish a telephone link to the inmate.

While effective, establishing a telephone link during trial delays the progress of the trial for several reasons. In most instances, establishing a telephone link poses logistic difficulties. Most courts do not have a telephone available in the courtroom where the trial is conducted. (Moreover, where phones are provided, they often are located at the defense counsel's table and, therefore, are not positioned such that the communications cannot be overheard by others present in the courtroom, thereby potentially destroying the attorney-client privilege.) As a result, if an attorney-client communication is needed, the defense attorney is required to leave the courtroom and call the prison from a private room outside of the courtroom.

At the prison, the difficulties are particularly acute because video conferencing facilities typically do not include a separate phone. As a result, the prisoner must be escorted to a private room within the prison and the defense attorney's call must be routed to that private room. When the call ends, the attorney returns to the courtroom and the trial participants await the return of the inmate to the video conferencing room. The inmate's return may be delayed for several reasons, including any delays associated with escorting the inmate from the private telephone room back to the video conference facility.

It should be noted that the general concept of a courtroom/jail video conference system is not new. Several prior art courtroom video conferencing systems are discussed below.

U.S. Pat. No. 4,965,819 ("the '819 patent") describes a video conferencing system for courtroom and other applications. In particular, the '819 patent describes a system that permits a person, at a remote location, to communicate interactively with a group of users at a local station, such as a group conducting a legal proceeding in a courtroom. One purported advantage of the system provides a station where the conferees may maintain eye contact with the screen and camera simultaneously. The system also includes a recording device to create a permanent audio-visual record of the proceeding.

The basic set-up of the video conferencing system described by the '819 patent is shown in FIGS. 1 and 2. The system accommodates four conferees, the judge 1, the prosecutor 2, the defense attorney 3, and the witness 4 at the courtroom location. The defendant 5, who is also a participant, is connected as shown in FIG. 2. In addition, the system includes a control module operated by a technician 6, who is also shown in FIG. 2.

As noted at column 4, lines 25–28, the defense attorney 3 may communicate privately with the defendant over a telephone link comprising a local telephone 50, remote telephone 52, and telephone line 51. The local telephone line 51 does not appear to travel through the same communications link as the remainder of the video conference communication. This is supported by the description at col. 5, lines 1–19.

The defendant 5 may communicate directly with the defense attorney 3 using the telephone 52. The telephone line 51 may be secured by providing voice scrambling circuitry with signal descrambling circuitry in each of the phones 50, 52. In one preferred embodiment, the system computer 68 may receive a "private line" signal when the telephones 50, 52 are in use. When the "private line" signal is received by the computer 68, recording of the conference is disabled.

While the system described in the '819 patent does provide one means permitting a private attorney-client communication between the defense attorney and the inmate, there are several disadvantages to the system described. First, the arrangement is akin to the set-up discussed above where a separate telephone connection must be established between the courtroom and the jail. Second, the telephone 50 at the defense attorney's table is not in a private location. As a result, aspects of the conversation potentially may be overheard by others in the courtroom, thereby defeating the attorney-client privilege. Third, telephone communications do not provide the defense attorney and the inmate to communicate non-verbally, which may impede the parties' ability to effectively discuss a particular point of law or factual issue.

Another prior art video conferencing system designed for courtroom use is described in U.S. Published patent application No. 2003/0174826 ("the '826 application"), which discusses an inmate video visitation system. As described in paragraph [0014], the prison visitation system has a visitation site with a first station used by a conference coordinator and a plurality of visitation stations. The prison site also includes a number of visitation stations. The stations are connected together at hubs and the hubs are interconnected.

The video conferencing architecture 200 includes a prisoner visitation system 300 with a central site 301, court 310, office 311, visiting center 312, and two jails 313, 314. A jail management system 302 may be included with a database 304 that assists with management of the prisoner visitation system 300. The court 310 portion of the system 300 includes conference participant stations for a judge 315, prosecutor 316, defense attorney 317, and witness 318. Two or more of the participants may engage in a separate conversation using the described system.

The system described by the '826 application includes no provision for a separate, private communication between a defense attorney and the inmate. As a result, if an attorney-client communication must be established, the participants must establish a separate telephone link for that communication. The disadvantages of establishing such a system have been discussed above.

As previously mentioned, a difficulty with prior art trial video conference systems is the inability to provide a private communications link to the inmate in a manner that facilitates the privileged, attorney-client communication in a video conference mode.

While standard (non-trial) video conferencing systems known in the prior art do provide the ability to establish a private communication between a subgroup of participants to the main conference, these prior art video conferencing systems do not provide a solution to the problems identified above.

Several prior art video conferencing systems are known to include at least one mode of operation where two or more parties to the video conference call may confer separate and apart from the remaining participants in the conference call. There are two purposes for which a separate conference may be initiated. First, one participant in the conference call may wish to add a new participant. That person may call the new participant and speak with the new participant in privacy before adding the new participant to the existing conference call. Second, two or more participants in an established conference call may wish to discuss a particular privately in a separate conference call and, after the private conversation, rejoin the ongoing conference call with all of the participants.

U.S. Pat. No. 5,625,407 ("the '407 patent") describes a video conferencing system including functionality that addresses the first of the two purposes listed above. The '407 patent describes a multimedia conferencing system where a multimedia communication link 118, 120, 122 is established between first and second endpoints 104, 106 and a multimedia server 102 (or "MMS 102"). The system may operate in a "Privacy Mode" for a portion of its operation, which is described at col. 9, lines 44–55. In this mode, the endpoint device 104 informs the MMS 102 of the desire to add a third party. The MMS 102 then establishes a connection 122/121 to the endpoint 165 of the third party. Next, the MMS 102 establishes a private conversation between the endpoint device 104 and the third party endpoint device 165. Subsequently, the third party endpoint 165 may be added to the conference between the endpoint devices 104, 106. This is accomplished through the multimedia signal routing device 129.

U.S. Pat. No. 5,963,246 ("the '246 patent") describes a multi-point video conference system that provides a functionality consistent with the second of the two purposes listed above. In particular, the system described in the '246 patent facilitates a privacy communication between specific points in a multi-point conference. One object of the patent is to provide a multi-point video conference system where the privacy communication can be realized by simply modifying multi-point video conference terminals. The basic arrangement of one embodiment of the system is illustrated in FIG. 5.

As shown in FIG. 5, a command input device 11 outputs a signal 20S to the multiplexing unit 10 indicating that the user wishes to engage in a privacy communication. The signal 20S also includes information identifying one other terminal with which the privacy communication is desired. The multiplexing unit 10 receives the compressed video signal from the image CODEC 16 as an image channel, the compressed audio signal from the voice CODEC 17 as a voice channel and the privacy communication control signal 20S as a data channel. If any terminal is not part of the privacy communication, the audio and video outputs to that terminal are muted (or disabled).

One example of the operation of the system described begins at the top of column 14 of the '246 patent. When the user at terminal 1a requests a privacy communication with the user of terminal 1b, the user 1a inputs a command signal in the command input device 11. The signal 20S includes an identifier for the terminal 1b, which is the recipient of the privacy communication. The information of the privacy communication and the privacy control signal 20S are sent to all of the users at terminals 1a–1d. However, because the privacy signal 20S controls the operation of the terminals 1a–1d, only those terminals selected to participate in the conversation are permitted to view and hear the substance of the privacy communication. All others are excluded.

Similarly, U.S. Pat. No. 6,020,916 ("the '916 patent") describes a video conferencing system permitting two or more users to initiate a private conference. The user of the video phone 13 may mute or suppress the outgoing audio/video to one or more of the other videophones.

U.S. Pat. No. 6,185,285 ("the '285 patent") also describes a teleconferencing system permitting two or more parties to have a private conversation.

U.S. Pat. No. 6,343,314 ("the '314 patent") describes a PC-based video conferencing system that permits two or more parties in the conference call to establish a private conference.

One aspect of prior art video conferencing systems lies in the construction of such systems to establish a multipoint conference call between participants. So designed, these systems overlook a point-to-point connection such as the type required for video conferencing between a courtroom and a jail. Accordingly, prior art video conferencing systems are not well suited to a courtroom-jail connection. In addition, because these systems rely on a multipoint connection, they are not well suited to be adapted for use in a point-to-point connection, such as the type required to be established when a courtroom and jail are to be communicatively connected with one another during a trial proceeding.

What should be apparent from the discussion of these prior art video conferencing systems is the fact that they are not readily applicable to the courtroom trial setting. These systems rely on the video phones at the various endpoints of the conference call to effectuate the private communication. In a courtroom setting, the input devices for the defense attorney are the microphone and camera set up at the defense attorney's table. Accordingly, it is virtually impossible for the defense attorney to communicate privately with the inmate unless all of the other participants in the trial (including the judge, prosecuting attorney, bailiff, court reporter, jurors, and members of the public in the gallery) were all to leave the courtroom during the private, attorney-client discussion.

Also, as discussed the multipoint architecture of prior art video conferencing systems is not well suited for use in a trial. As should be appreciated by those skilled in the art, the multipoint architecture is not easily adapted to a point-to-point video conference architecture of the type needed for video trial proceedings.

Therefore, one problem not addressed by the prior art remains the inability of existing video conferencing systems to provide a secure audio-visual communications link between the courtroom and the jail so that the defense attorney and the inmate may have a face-to-face discussion in a time-effective manner so that trial is not unnecessarily delayed.

Another problem not addressed by the prior art is the inability of prior art systems to use the communications line established between the courtroom and the prison for both the trial proceedings and the private, attorney-client discussion.

These problems, among others, cry out for a solution.

SUMMARY OF THE INVENTION

The present video conferencing system addresses many of the needs identified with respect the prior art.

To that end, one aspect of the present invention is to provide a conference system that includes a communications link coupling a first location to a second location. A first input-output device is disposed at the first location, generating a signal from an attorney. A second input-output device is disposed at the second location, generating a signal from the attorney's client, the attorney and the client having a relationship protected by the attorney-client privilege. A third input-output device is disposed at the first location, generating a signal from a third party. A signal processor disposed in the communications link between the first and second locations. The signal processor routes the signals between the input-output devices at the first and second locations. In addition, a control panel is operatively coupled to the signal processor, providing control over the signals routed thereby. The communications link communicatively couples the first, second and third input-output devices to one another, such that each of the input-output devices is configured to receive and play signals from the others of the input-output devices. Moreover, the control panel also controls the input-output devices so that a private communication may be established between the first and second input-output devices, at the exclusion of the third input-output device, such that the signals generated by the first and second input-output devices are maintained in confidence and such that the attorney and the attorney's client are permitted to engage in a private communication without vitiating the attorney-client privilege.

It is still another aspect of the invention to provide a conference system with a communications link establishing a point-to-point conference between the first and second locations.

One further aspect of the invention provides that the signals generated by the system have audio and video components.

Additionally, it is an object of the invention to provide a control interface device disposed in the communications link. The control interface device is communicatively coupled between the first input-output device and the signal processor. The signal processor is communicatively coupled between the control interface device and the second input-output device. Moreover, the control panel is operatively coupled to the control interface device.

Another aspect of the present invention is to provide a system that includes first and second control interface devices in the communications link between the first and second input-output devices. The first input-output device is communicatively coupled to the first control interface device. The first control interface device is communicatively coupled between the first input-output device and the signal processor. The signal processor is communicatively coupled between the second control interface and the second input-output device. The control panel is operatively coupled to the second control interface.

Yet another aspect of the invention is to provide a control interface device disposed in the communications link, communicatively coupled between the signal processor and the second input-output device.

One further aspect of the invention is to provide first and second control interface devices disposed in the communications link, operatively coupled between the first and second input-output devices. The second input-output device is communicatively coupled to the first control interface device. The first control interface device is communicatively coupled between the second input-output device and the signal processor. In addition, the signal processor is communicatively coupled between the second control interface and the second input-output device.

Still one further aspect of the invention is directed to locating the first input-output device in a courtroom and the second input-output device in a jail.

Another aspect of the invention is that the display device is disposed within the courtroom and is capable of playing the signals generated by the input-output devices.

An aspect of the invention is that at least a portion of the communications link comprises at least one selected from a wired connection, a wireless connection, a network connection, and the Internet.

Also, a further aspect of the invention is that the control panel is configured to be controlled by a judge.

Still another aspect of the invention is that the attorney is a defense attorney and the attorney's client is a jail inmate.

One additional aspect of the invention provides for a conferencing system where the first input-output device is configured to capture audio-visual information from the defense attorney and the second input-output device is configured to capture audio-visual information from the jail inmate during a trial proceeding.

Next, it is an aspect of the invention to provide a configuration of the third input-output device to capture audio-visual information from a prosecuting attorney during a trial proceeding. 15.

Still another aspect of the invention provides a fourth input-output device configured to capture audio-visual information from a judge overseeing the trial proceeding.

One additional aspect of the invention concerns a display device communicatively coupled to the signal processor to display information generated by the input-output devices.

It is yet another aspect of the invention to provide for a plurality of input devices communicatively coupled to the communications link. The plurality of input devices are configured to interject audio-visual information for play on the at least one display device during the trial proceeding.

One further aspect of the invention provides for a plurality of input devices including, among others, a computer, a video cassette recorder, a digital video disk recorder, a memory device, an audio recorder, and a document camera.

Another aspect of the invention concerns a the control panel being a personal computer, an telephone handset, a touchpad device, a touch-screen device, a keypad device, or other suitable input device.

Still another aspect of the invention provides for the signal processor being a switching device.

Another aspect of the invention provides for the first input-output device having a first privacy handset and the second input-output device having a second privacy handset. The handsets permit the attorney and client to engage in a private communication without vitiating the attorney-client privilege.

One further aspect of the invention is a method for audio-video conferencing between a courtroom and a jail.

Yet another aspect of the invention provides a conference system having a communications link coupling a first location to a second location. A first input-output device is disposed at the first location and generates a signal from an first party. A second input-output device is disposed at the second location and generates a signal from a second party. A third input-output device is disposed at one of either the first and second locations and generates a signal from a third party. A signal processor is disposed in the communications link between the first and second locations. The signal processor routes the signals between the input-output devices at the first and second locations. A control panel is operatively coupled to the signal processor and provides control over the signals routed thereby. The communications link communicatively couples the first, second and third input-output devices to one another, such that each of the input-output devices is configured to receive and play signals from the others of the input-output devices. The control panel also controls the input-output devices so that a private communication may be established between the first and second input-output devices, at the exclusion of the third input-output device, such that the signals generated by the first and second input-output devices are maintained in confidence.

Other aspects of the invention will become apparent from the discussion that follows.

BRIEF DESCRIPTION OF THE DRAWINGS

The drawings appended hereto are included to facilitate discussion and understanding of the broad scope of the present invention. Where appropriate, like reference numerals are used to identify like components of the invention, in which.

DESCRIPTION OF PREFERRED EMBODIMENTS OF THE INVENTION

In the discussion that follows, the system of the present invention will be described in connection with a video conferencing apparatus that permits audio-visual ("A/V") communication between a courtroom and a jail. (It is noted that, while there is a definitional distinction between the term "jail" and "prison," the two terms are used interchangeably herein.) The system also provides for the display and recording of AN images within the courtroom. While the courtroom/jail environment defines the parameters of the preferred application of the present invention, the invention is not limited solely to this specific environment. To the contrary, as should be appreciated by those skilled in the art, the invention has wide applicability to a number of different environments, of which the courtroom/jail setting is but one. For example, it is contemplated that the invention may provide AN communications between two parties in a negotiation, mediation or arbitration (or any other type of proceeding, legal or otherwise) where separate, privileged, attorney-client (or any other type of private) communication may be required during such proceedings.

Figure 1A:
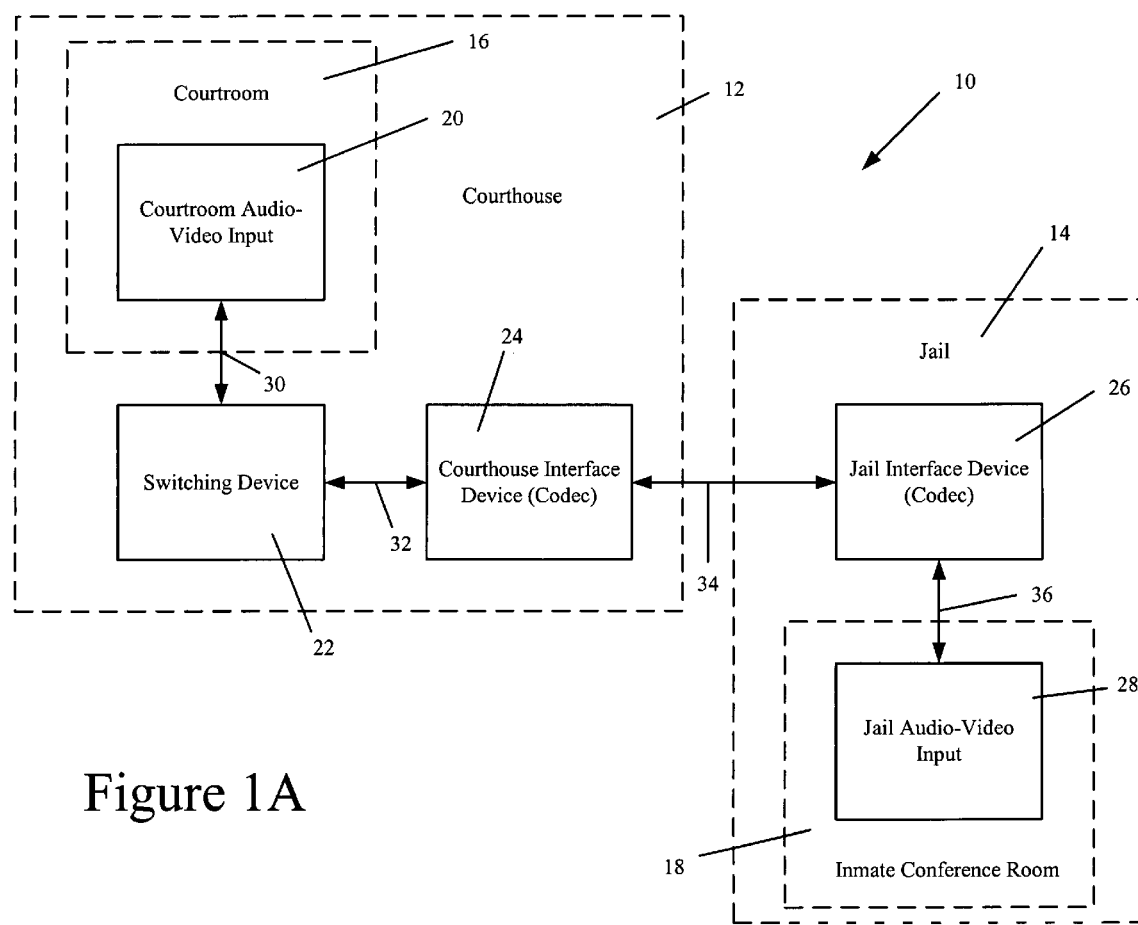
FIG. 1A is a schematic illustration of a broad overview of one embodiment of the system of the present invention.

The basic configuration of one embodiment of the system 10 of the present invention is depicted in FIG. 1A. As illustrated, the preferred embodiment of the system 10 is installed between a courthouse 12 and a jail 14. The system 10 permits point-to-point communication between one or more individuals located within a courtroom 16 in the courthouse 12 and an inmate physically located in the jail 14.

As would be appreciated by those skilled in the art, the system 10 of the present invention may be connected between several courthouses 12 and several jails 14. Moreover, the system 10 of the present invention may connect a plurality of courtrooms 16 to a plurality of jails 14. Alternatively, the system 10 of the present invention may connect a number of courtrooms 16 to a number of inmate conference rooms 18 within the jail 14. Therefore, while the following discussion focuses on an A/V conferencing system 10 that connects one from a plurality of courtrooms 16 in a courthouse 12 to one from a plurality of inmate conference rooms 18 in the jail 14, the system 10 is intended to have significantly wider applicability.

As illustrated in FIG. 1A, a courtroom A/V input-output ("IO") device 20 is provided in the courtroom 16. The courtroom A/V IO device 20 preferably receives audio and video input from the participants in the courtroom 16 and generates an A/V signal that is sent to a switching device 22.

As will be appreciated from the discussion that follows, the courtroom A/V IO device 20 preferably encompasses a plurality of A/V IO devices and, therefore, should not be understood to refer only to a single A/V IO device. One switching device 22 preferably is associated with each courthouse 12. The switching device 22 basically operates as a public exchange device (otherwise referred to as a "PBX" device). The A/V signals from the A/V IO device 20 in each of the courtrooms 16 are collected, processed, and routed by the switching device 22 to various recipients, including the inmate conference room 18 at the jail 14. In other words, the switching device 22 is responsible for establishing a point-to-point communications link between a selected courtroom 16 and a selected inmate conference room 18 or jail 14, as appropriate.

Alternatively, the switching device 22 may be used to collect, process, and route signals from multiple courthouses 12 connected thereto. In such a configuration, the switching device 22 may connect several courthouses 12 together in instances where a single switching device 22 for a single courthouse 12 is not economically justified.

Regardless of the number of courthouses 12 or courtrooms 16 connected to the switching device 22, from the switching device 22, the A/V signal is sent to a courthouse interface device 24, which is a station interface device such as a codec that generates a compressed A/V signal (such as a compressed digital signal). The courthouse interface device 24 compresses the A/V signal prior to the signal's transmission to the jail 14. At the jail 14, the compressed A/V signal is processed by a jail interface device 26, which is a station interface device such as a codec that decompresses the A/V signal and transforms it into a signal that it may be processed and perceived by a recipient (e.g., the inmate). From the jail interface device 26, the A/V signal is sent to the jail A/V IO device 28 located in one of the inmate conference rooms 18 within the jail 14. As with the courtroom A/V IO device 20, the jail A/V IO device 28 preferably encompasses a plurality of A/V IO devices, as discussed in greater detail below. As a result, the jail A/V IO device 28 should not be understood to refer to only one A/V IO device.

It should be noted that, while the interface devices (codecs) 24, 26 have been discussed with reference to FIGS. 1A and 1B, it is contemplated that the system 10, 38 of the present invention could operate without one or both of the interface devices 24, 26. Specifically, if the jail and courthouse were located in very close proximity to one another, the interface devices 24, 26 would not be required. In such a system, the jail A/V IO device 28 would connect directly to the switching device 22.

As would be appreciated by those skilled in the art, when the A/V signal(s) are sent from the jail 14 to the courthouse 12, the interface devices 24, 26 operate in reverse. In other words, when an A/V signal is sent from the jail 14 to the courthouse, the jail interface device 26 compresses the A/V signal and the courthouse interface device 24 decompresses the A/V signal so that the signal may be routed and processed for viewing by participants within the courtroom 16.

Also as would be appreciated by those skilled in the art, the courtroom A/V IO device 20 and the jail A/V IO device 28 both combine at least one camera, one microphone, one visual display device (such as a television monitor) and at least one speaker. Together, the A/V IO devices 20, 28 are capable of creating, sending, and receiving audio and video signals to and from one another. As FIG. 1A illustrates, the system 10 is configured such that A/V signals may be transmitted from the courtroom A/V IO device 20 to the jail A/V IO device 28 and vice-versa. In this manner, the participants in the courtroom 16 are in direct communication with the inmate at the jail 14.

While the basic construction of both the courtroom and jail A/V IO devices 20, 28 includes the same basic componentry, they may look very differently from one another in their actual physical appearance when installed. For example, out of necessity, the jail A/V IO device 28 must be designed to withstand considerable abuse and wear and tear. Moreover, it must be built so that the componentry cannot be removed by an inmate and later fashioned into a weapon, for example. Accordingly, the camera, microphone, speakers, and monitor for the jail A/V IO device 28 typically are encased within a durable cabinet of one type or another. In one contemplated embodiment, the camera, microphone, speakers, and monitor may be encased within a wooden or steel cabinet with a plexiglass window, permitting visual access to the camera and monitor therein. Other constructions are also possible.

In contrast to the construction for the jail A/V IO device 28, the courtroom A/V IO devices 20 typically will take the form of combined monitors, cameras, microphones and speakers that are akin to the same components often accompanying most modern PCs. Being located within a courtroom 16, the A/V IO devices 20 preferably are not encased in a durable cabinet because, typically, they are not subjected to any unusual level of abuse. It is contemplated that A/V IO devices 20 will be provided for multiple users in the courtroom 16, including the judge, prosecuting attorney, defense attorney and the witness in the witness stand. Other participants also may be included, as necessary or as desired.

Also as illustrated in FIG. 1A, the communications links 30, 32, 34, 36 are two-way communication links. This means that electronic information (e.g., the A/V signal) travels in both directions along the communication links 30, 32, 34, 36. The communication links 30, 32, 34, 36 may be either wired or wireless. Moreover, any combination of wired and wireless links may be employed without departing from the scope and spirit of the invention. In addition, portions of the communications links 30, 32, 34, 36 may incorporate conventional telephone lines or connections via the Internet, among other types of connections.

Figure 1B:
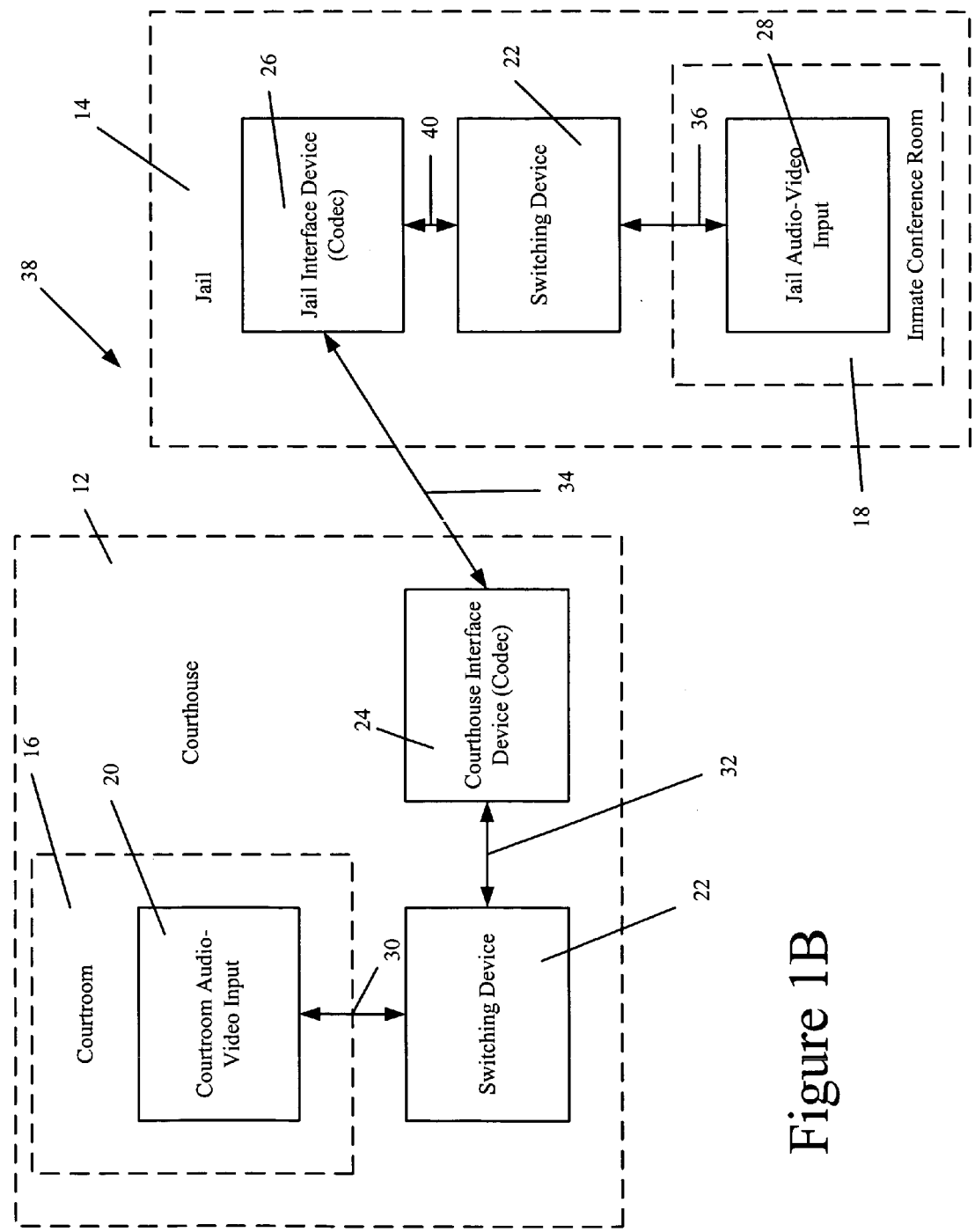
FIG. 1B is a schematic illustration of a broad overview of another embodiment of the system of the present invention.

FIG. 1B provides a schematic illustration of an alternative to the embodiment of the system 10 illustrated in FIG. 1A. In FIG. 1B, the system 38 has the same construction as the system 10 shown in FIG. 1A with one exception. The system 38 includes a switching device 22 interposed between the jail interface device 26 and the jail A/V IO device 28. A two way connection 40 establishes a pathway so that the A/V signal may travel from the courtroom A/V IO device 20 to the jail A/V IO device 28. The switching device 22 operates in the same manner as the switching device 22 located at the courthouse 12. In fact, in the preferred embodiment of the invention, the courthouse switching device 22 and the jail switching device 22 are identical (at least functionally identical).

When the jail 14 is provided with a switching device 22, it is contemplated that the jail 14 will exercise control over point-to-point video conferences with other facilities. As discussed above, one possible video conference that might be initiated from a jail is a visitation video conference between an inmate and a family member, for example, at a remote visitation facility.

Figure 2A:
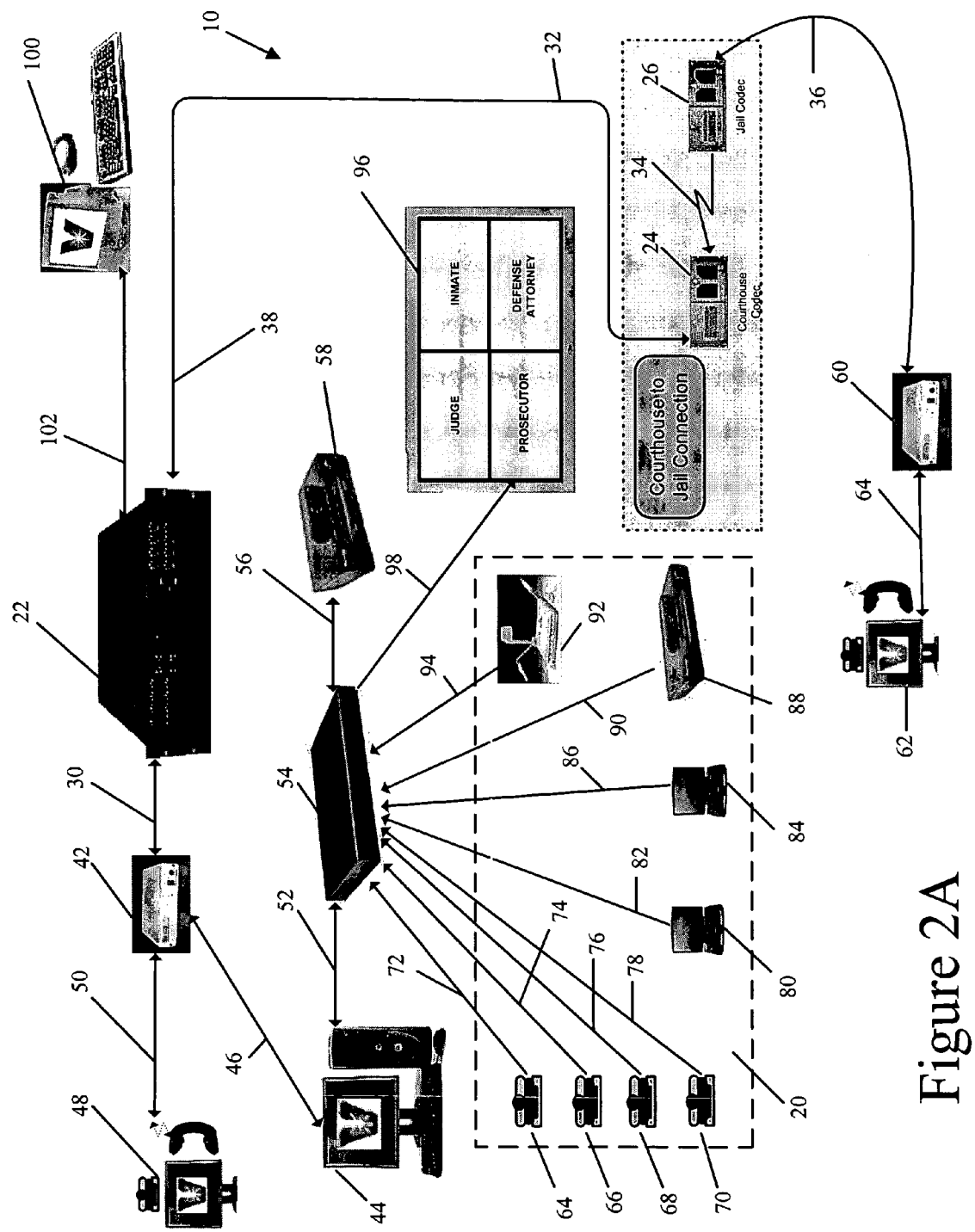
FIG. 2A is a schematic, detailed illustration of the embodiment of the system of the present invention shown in FIG. 1A.

FIG. 2A provides a more detailed schematic of the construction and layout of the embodiment of the system 10 illustrated in FIG. 1A. In this schematic representation, the various components of the system 10 are shown, as are the connections therebetween.

In FIG. 2A, the connection between the courthouse 12 and the jail 14 are the same as illustrated generally in FIG. 1A, with further detail being provided to facilitate understanding of the scope of the invention. The switching device 22 connects to a control interface device 42, which may comprise a multiplexer, via the two-way communications link 30. The control interface device 42 is connected, in turn, to a judge's control panel 44 through a two-way communications link 46. The control interface device 42 is also connected to the courtroom attorney-client sidebar station 48 via a two-way communications link 50.

The judge's control panel 44 may be any suitable device that provides the judge with control functionality over the system 10. In the preferred embodiment, the judge's control panel 44 is a PC with a monitor, keyboard, and mouse, among other peripherals. Alternatively, however, the judge's control panel 44 may be any other suitable input device including, but not limited to, a telephone handset, a touchpad device, a touch-screen device, and a keypad device. The judge's control panel 44 includes software that permits the judge to select, from menus, specific functionalities of the system 10, some of which will be discussed in greater detail below. In the preferred embodiment of the invention, as discussed in greater detail below, the judge's control panel 44 controls all aspects of the operation of the system 10.

While a PC is preferred for the judge's control panel 44, other controllers also may be used without departing from the scope of the present invention. For example, the judge's control panel 44 could consist of a standard AMX-type control pad or other dial control key pad. (As would be understood by those skilled in the art, "AMX" is a recognized manufacturer of a specific type of control pad.) To access particular functions of the system, the judge simply presses a particular key, dials in a particular sequence of keys, or enters a particular numeric code to implement operation of a particular functionality. The operation of the judge's control panel 44 is discussed in greater detail below.

The system 10 of the present invention is designed to provide the judge with absolute control over the system 10. To this end, the judge's control panel 44 is designed to control all of the goings-on within the courtroom 16. In addition, the judge's control panel 44 also controls the operation of the functionality in the jail 14, once a connection to the jail 14 has been established.

The judge's control panel 44 is connected, via a communications link 52 to the courtroom control interface device 54, which may comprise a multiplexer among other componentry. The courtroom control interface device 54 is connected, via a communications link 56 to a recording device 58. Alternatively, the recording device 58 may be connected to the judge's control panel 44 via a separate control interface device 54 or via a direct link (without a control interface device 54). The courtroom control interface device 54 is the device that collects information from the courtroom A/V IO devices 20 (and the jail A/V IO devices 28) and generates the A/V signal that is processed by the switching device 22 associated with the courthouse 12. Through the judge's control panel 44, the information collected from the courtroom A/V IO devices 20 (and the jail A/V IO devices 28) is organized for recording and/or for display to participants in the courtroom 16 (and/or the inmate conference room 18) by the courtroom control interface device 54.

In the preferred embodiment, the recording device 58 records both audio and video signals. The recording device 58 may be, for example, a video cassette recorder ("VCR"), a digital video disk ("DVD") recorder, a digital memory or any other suitable alternative recording device.

As discussed, the judge's control panel 44 is connected through the control interface device 42 to the courtroom attorney-client sidebar A/V station 48 that is positioned in a private location within the courtroom 16. Since the communications links between the judge's control panel 44 and the courtroom attorney-client sidebar station 48 are two-way links, signals from judge's control panel 44 travel through the control interface device 42 to the courtroom attorney-client sidebar station 48. From the courtroom attorney-client sidebar station 48, the A/V signals travel through the control interface device 42, through the switching device 22, through the courthouse interface device 24, and through the jail interface device 26. From the jail interface device 26, the A/V signals travel through the jail control interface device 60 and are retrieved and played on the inmate attorney-client sidebar station 62. The jail control interface device 60 is connected to the inmate attorney-client sidebar station 62 via a two-way communications link 64.

As also illustrated in FIG. 2A, the courtroom control interface device 54 is connected to a number of peripheral devices, referred to above as the courtroom A/V IO device 20. In this regard, the courtroom attorney-client sidebar station 48 also may be considered as one of the courtroom A/V IO devices 20 since the station 48 generates an A/V signal that is processed by the system 10 and sent to the jail A/V IO device 28. Naturally, as FIG. 2A illustrates, the connections for the courtroom attorney-client sidebar station 48 differ from the remaining peripherals, all of which preferably connect to the courtroom control interface device 54 as shown.

The courtroom control interface device 54 may receive input from several individual devices including the judge's camera and microphone 64, the prosecutor's cameras and microphone 66, the defense attorney's camera and microphone 68, and one or more camera and microphones 70 positioned in the courtroom 16 to capture the overall activity in the courtroom 16. In each of these cases, the camera/microphone devices 64, 66, 68, 70 are connected to the courtroom control interface device 54 via one-way communications links 72, 74, 76, 78. Since these devices provide input to the courtroom control interface device 54 but do not require the receipt of an output signal (at least not in the embodiment of the system 10 illustrated), one-way communications links are all that are required. Of course, it is contemplated that the links may be a two-way links, if control over particular camera/microphones devices 64, 66, 68, 70 is desired. For example, it is contemplated that a system may be installed that permits the judge to turn off one or more of the peripheral devices connected to the courtroom control interface device 54 using the judge's control panel 44. Also, it may be possible for the judge to control the zoom factor for specific cameras, etc., connected to the courtroom control interface device 54. As a result, two-way communications links to the camera/microphone devices 64, 66, 68, 70 may be desired.

As FIG. 2A illustrates, other peripheral devices also may be connected to the courtroom control interface device 54. For example, the prosecutor's laptop 80 may be connected to the courtroom control interface device 54 via the one-way communications link 82. Similarly, the defense attorney's laptop 84 may be connected to the courtroom control interface device 54 via a one-way communications link 86. In addition, so that the contents of specific video tapes may be displayed to the judge and jury (e.g., the taped confession of the inmate), a VCR or DVD player 88 may be connected to the courtroom control interface device 54 via a one-way communications link 90. Finally, so that documents may be displayed to the judge and jury, a document camera 92 also may be connected to the courtroom control interface device 54 via a one-way communications link 94. As would be appreciated by those skilled in the art the peripherals 80, 84, 88, 92 connected to the courtroom control interface device 54 are but a few examples of the variety of peripherals that may be connected thereto. Other examples include a memory device or audio recorder.

The courtroom control interface device 54 is connected to one or more display devices 96 via a one-way communications link 98. The display devices 96 preferably are flat panel monitors located at one or more locations in the courtroom 16. As would be appreciated by those skilled in the art, however, the display devices 96 alternatively may be one or more cathode ray tube ("CRT") television monitors positioned within the courtroom 16.

FIG. 2A also shows an administrative station 100. The administrative station 100 is connected to the switching device 22 via a two-way communications link 102. The administrative station 100 is not needed for operation of the system 10. The administrative station 100 is used primarily for testing and maintenance functions that assure optimal performance of the system 10. Moreover, the administrative station 100 preferably has access to diagnostic tools and software that may be utilized should an error in the system 10 develop during operation. The administrative station 100, therefore, is contemplated to be a diagnostic station only. Of course, as may be appreciated by those skilled in the art, the administrative station 100 could be used for purposes other than diagnostics, if desired.

Figure 2B:
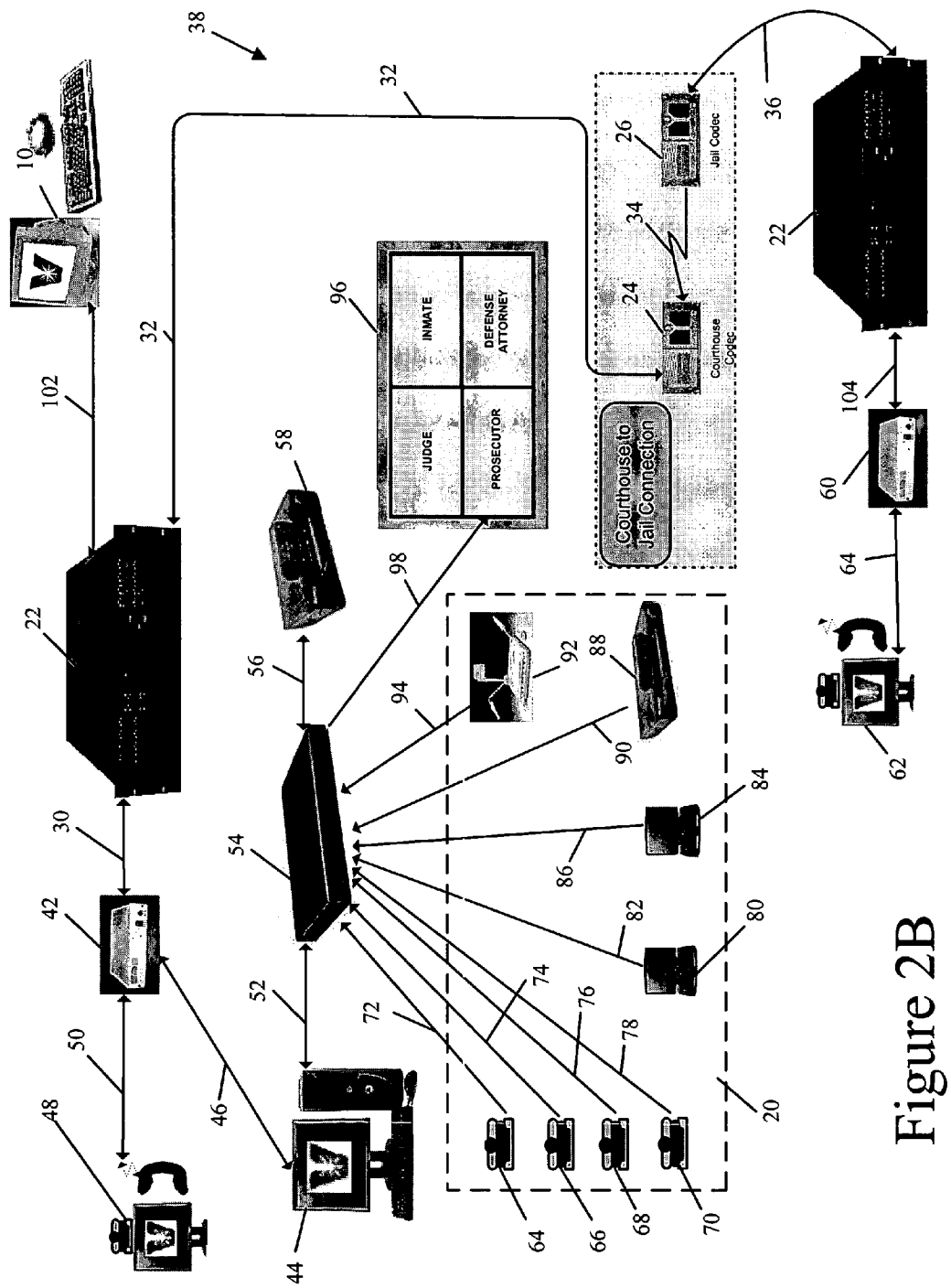
FIG. 2B is a schematic, detailed illustration of the embodiment of the system of the present invention shown in FIG. 1B.

FIG. 2B illustrates a slight variation of the system 10 shown in FIG. 2A. In FIG. 2B, the system 38 illustrated in FIG. 1B is shown in greater detail. For the most part, the system 38 is the same as that shown in FIG. 2A with the following exceptions. In the system 38, a switching device 22 has been interposed between the jail interface device 26 and the jail control interface device 60. To complete the communications path from the courthouse 12 to the jail 14, a two-way communications link 104 extends between the switching device 22 and the jail control interface device 60.

Figure 3A:
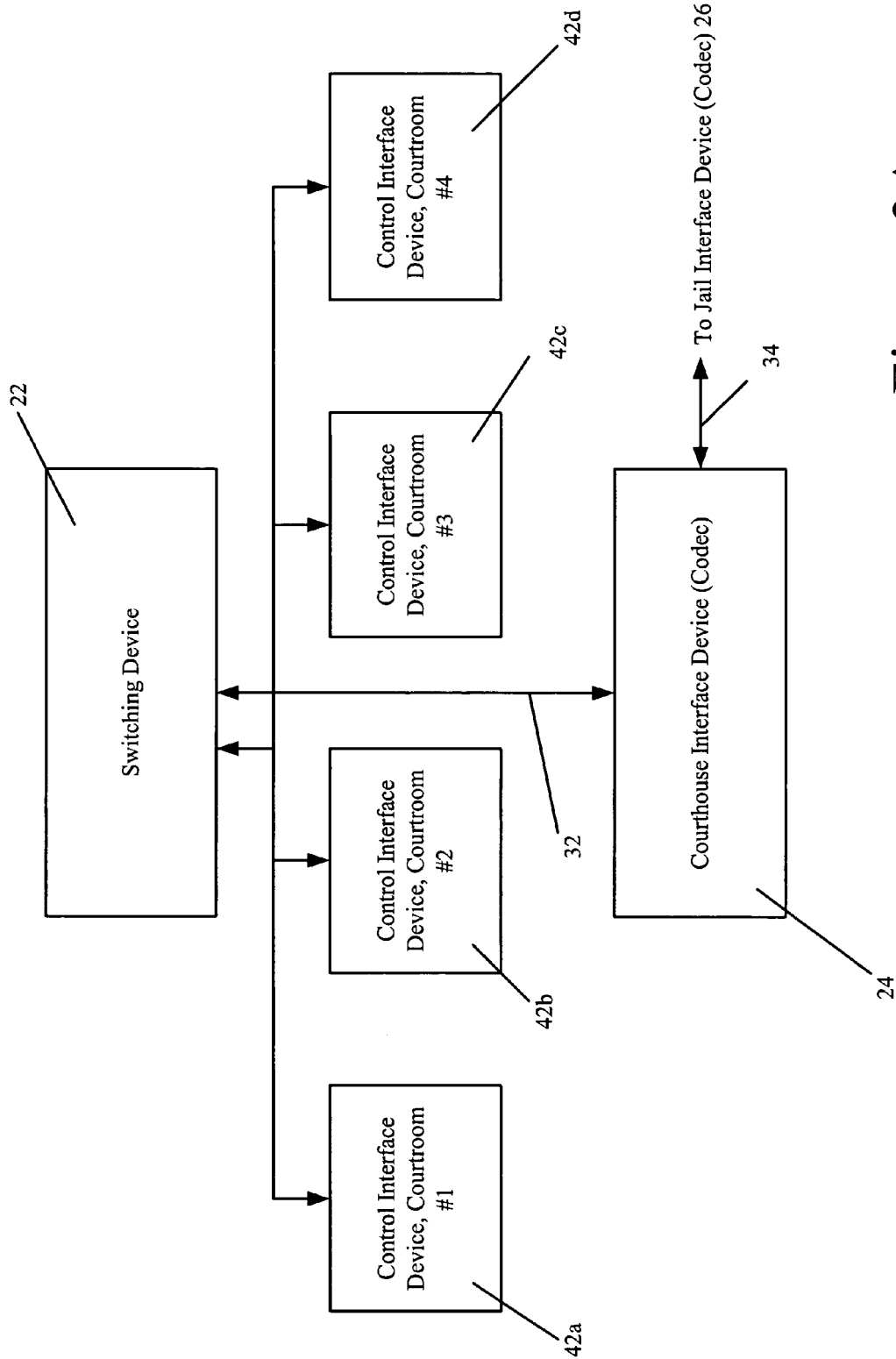
FIG. 3A is a schematic detail of the connection between several components of the system of the present invention as illustrated in FIGS. 1A and 2A.

FIG. 3A is a schematic illustration of a typical set-up of a portion of the system 10, 38 contemplated for a courthouse 12. As shown, in the preferred embodiment, the switching device 22 is connected to one courtroom control interface device 42a, 42b, 42c, 42d for each courtroom 16 within the courthouse 12. Therefore, in a courthouse 12 with four courtrooms 16, the switching device 22 connects to four courtroom control interface devices 42a, 42b, 42c, 42d. The set up of the system 10, 38 in each of the courtrooms 16 is the same as the set up illustrated in FIGS. 1A through 2B. In other words, the judge in each courtroom 16 has access to a separate judge's control panel 44 that operates the system 10, 38 present in that courtroom 16.

Figure 3B:
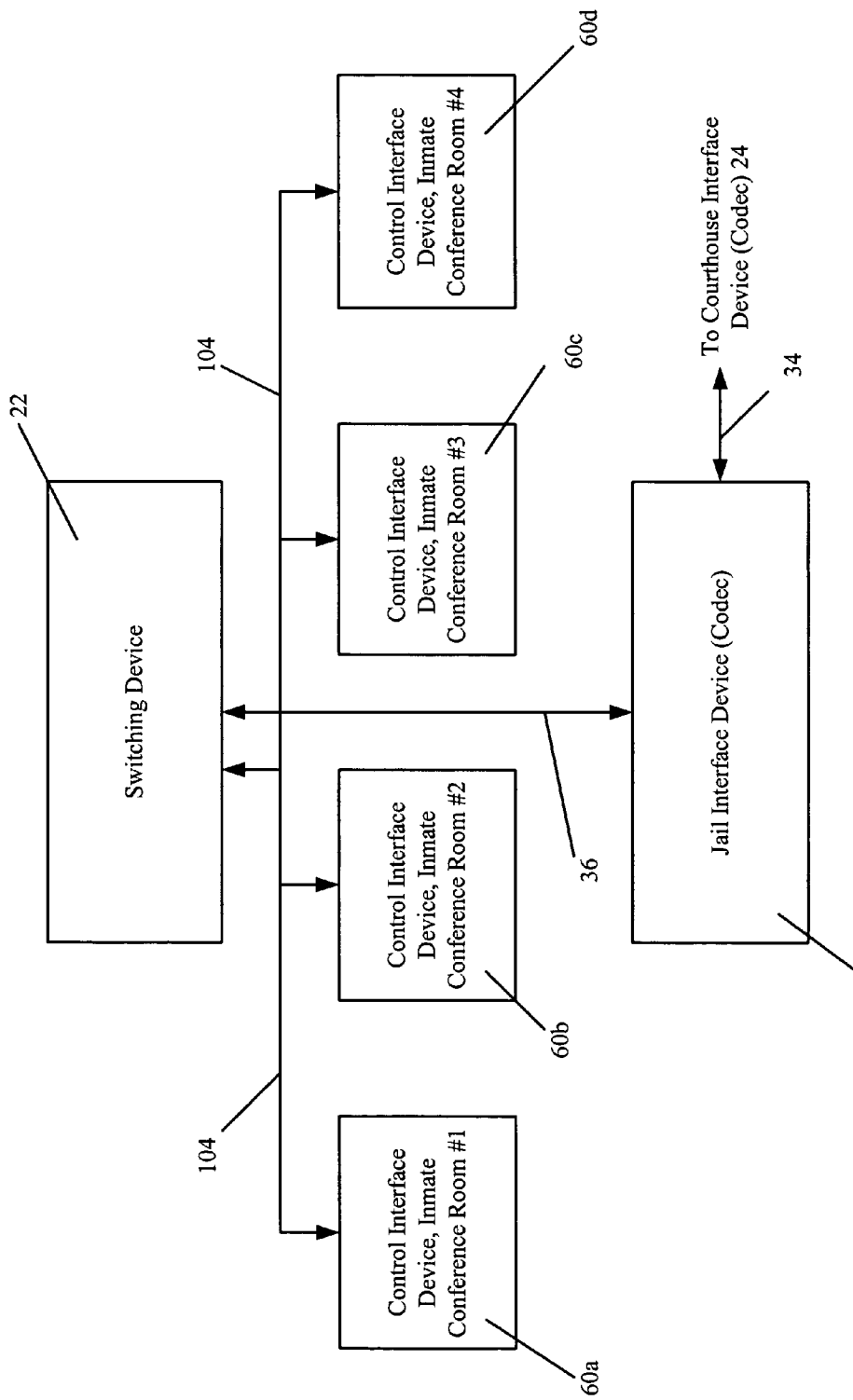
FIG. 3B is a schematic detail of the connection between several components of the system of the present invention as illustrated in FIGS. 1B and 2B.

FIG. 3B is a schematic illustration of a typical set-up of a portion of the system 38 contemplated for the jail 14. Preferably, the switching device 22 associated with the jail 14 connects to several control interface devices 60a, 60b, 60c, 60d, one associated with each inmate conference room 18 in the jail 14. Therefore, in a jail 14 with four inmate conference rooms 18, the switching device 22 connects to four control interface devices 60a, 60b, 60c, 60d. The set up for each of the inmate conference rooms 18 preferably is the same.

Figure 4:
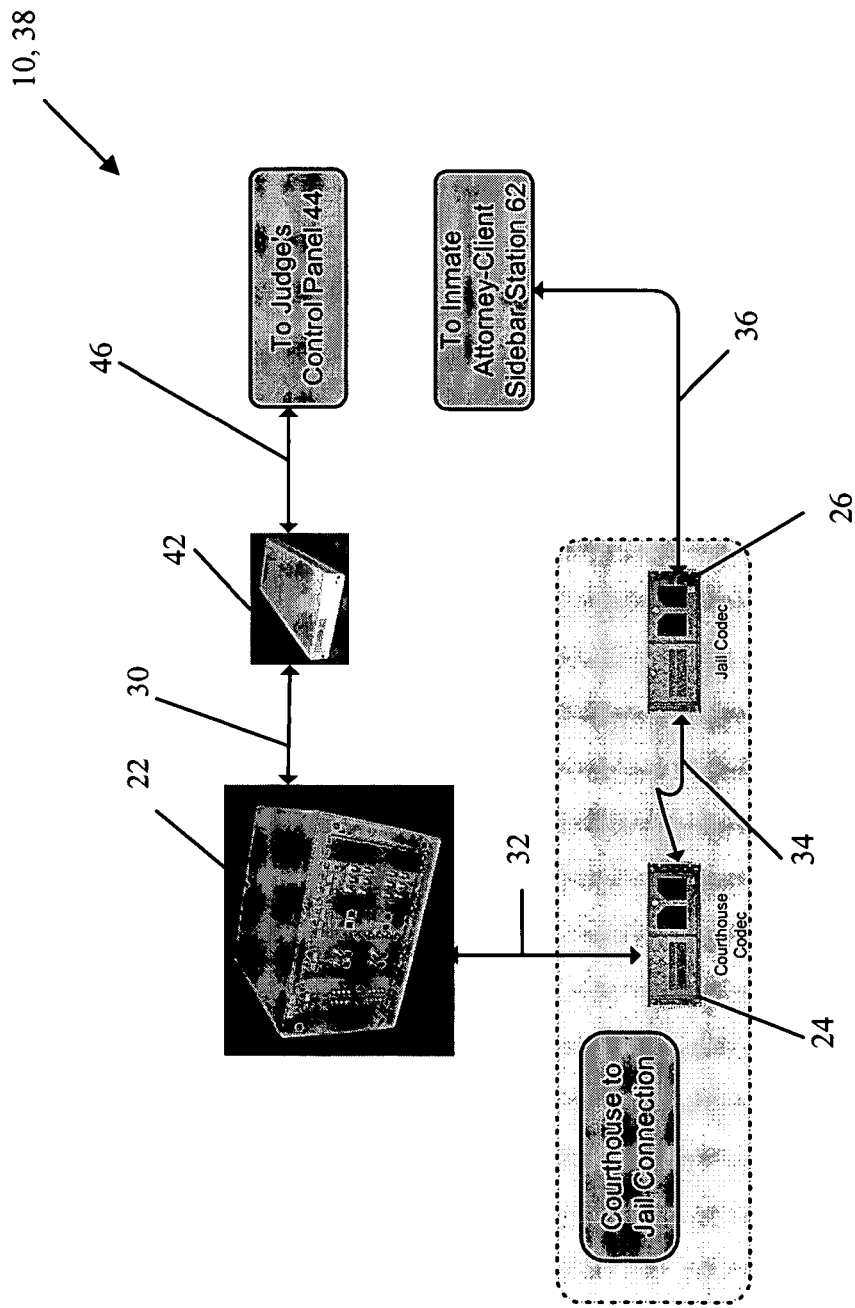
FIG. 4 is a schematic illustration of a broad, simplified overview of the construction of the system of the present invention as illustrated in FIGS. 2A and 2B.

To simplify the discussion of the present invention, FIG. 4 presents a schematic illustration of the connections between various components of the system 10, 38 illustrated in FIGS. 2A and 2B. In particular, the switching device 22 is connected to a control interface device 42 via a two-way communications link 30. The control interface device 42, in turn, is connected to the judge's control panel 44 via the two-way communications link 46. The switching device 22 also is connected to the courthouse interface device 24 via a two-way communications link 32. The courthouse interface device 24 is connected to the jail interface device 26 via a two-way communications link 34. The jail interface device 26 is connected to the inmate attorney-client sidebar station 62 via the two way communications link 36, among others.

Figure 5:
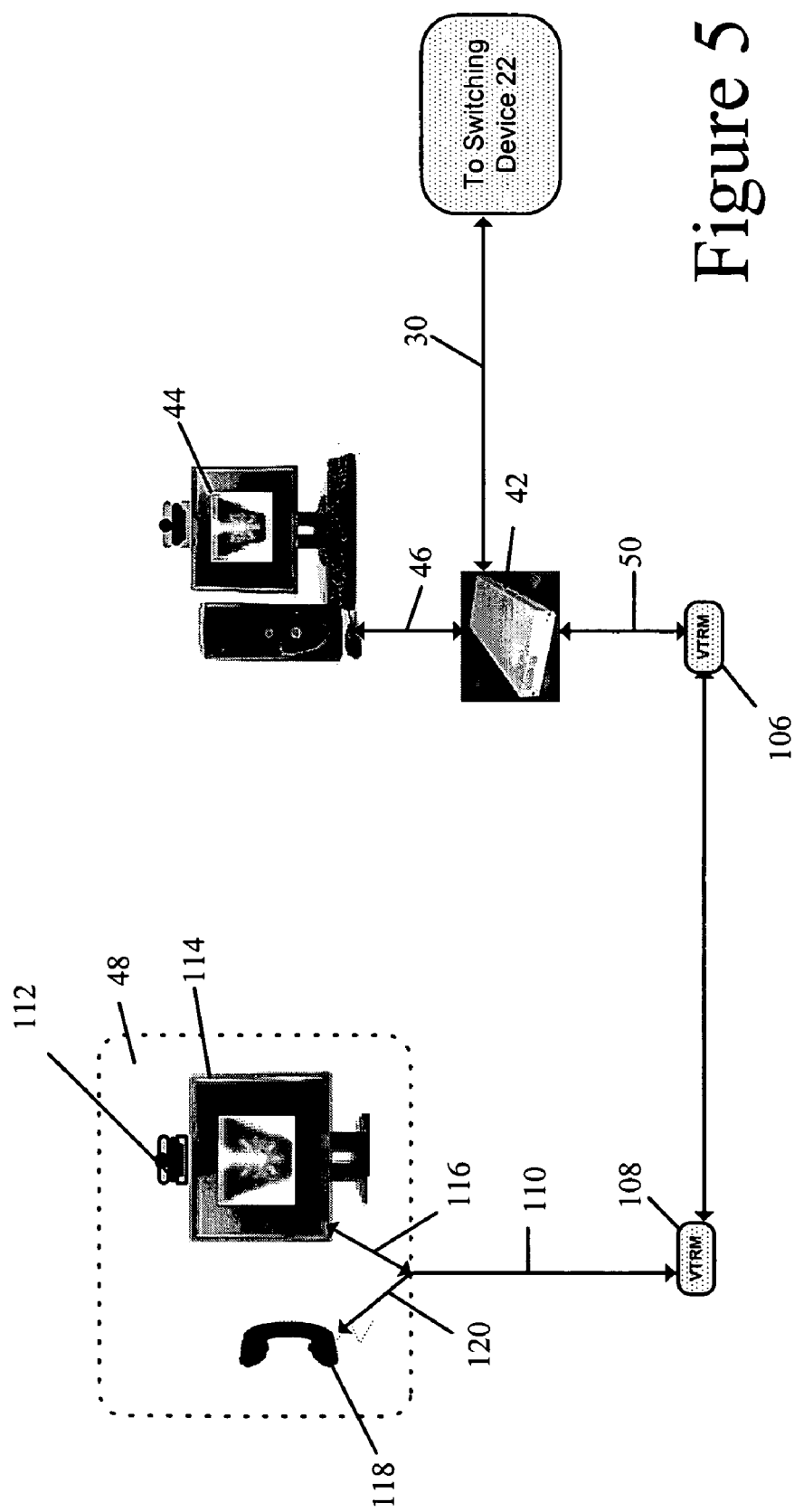
FIG. 5 is a schematic illustration of the connections associated with one embodiment of the courtroom attorney-client sidebar station contemplated for use with the system of the present invention.

FIG. 5 illustrates one arrangement contemplated for the connections between the courtroom attorney-client sidebar station 48 and the judge's control panel 44. In this arrangement, the judge's control panel 44 connects to the control interface device 42 via the two-way communications link 46. The control interface device 42 communicates with the switching device 22 via the two-way communications link 30. The control interface device 42 communicates with a video transmit/receive module ("VTRM") 106. The VTRM 106 translates the A/V signal into a wired or wireless signal. The A/V signal is received by the corresponding VTRM 108 where it is transformed back into a single-ended electrical signal, carried by the two-way communications link 110. The communications link 110 splits at the courtroom attorney-client sidebar station 48, permitting the station to operate in a usual video conference mode and in a private mode. In the usual video conference mode, a camera and microphone 112, connected to a monitor 114, generate an A/V signal that travels along the two-way communications link 116. In the privacy mode, the handset 118 is used to capture and relay audio signals. The camera 112 continues to function as normal, except that the associated microphone is not needed in the privacy mode. The audio signal generated by the handset 118 travels along the two-way communications link 120, where it connects with the two-way communications link 110.

Figure 6:
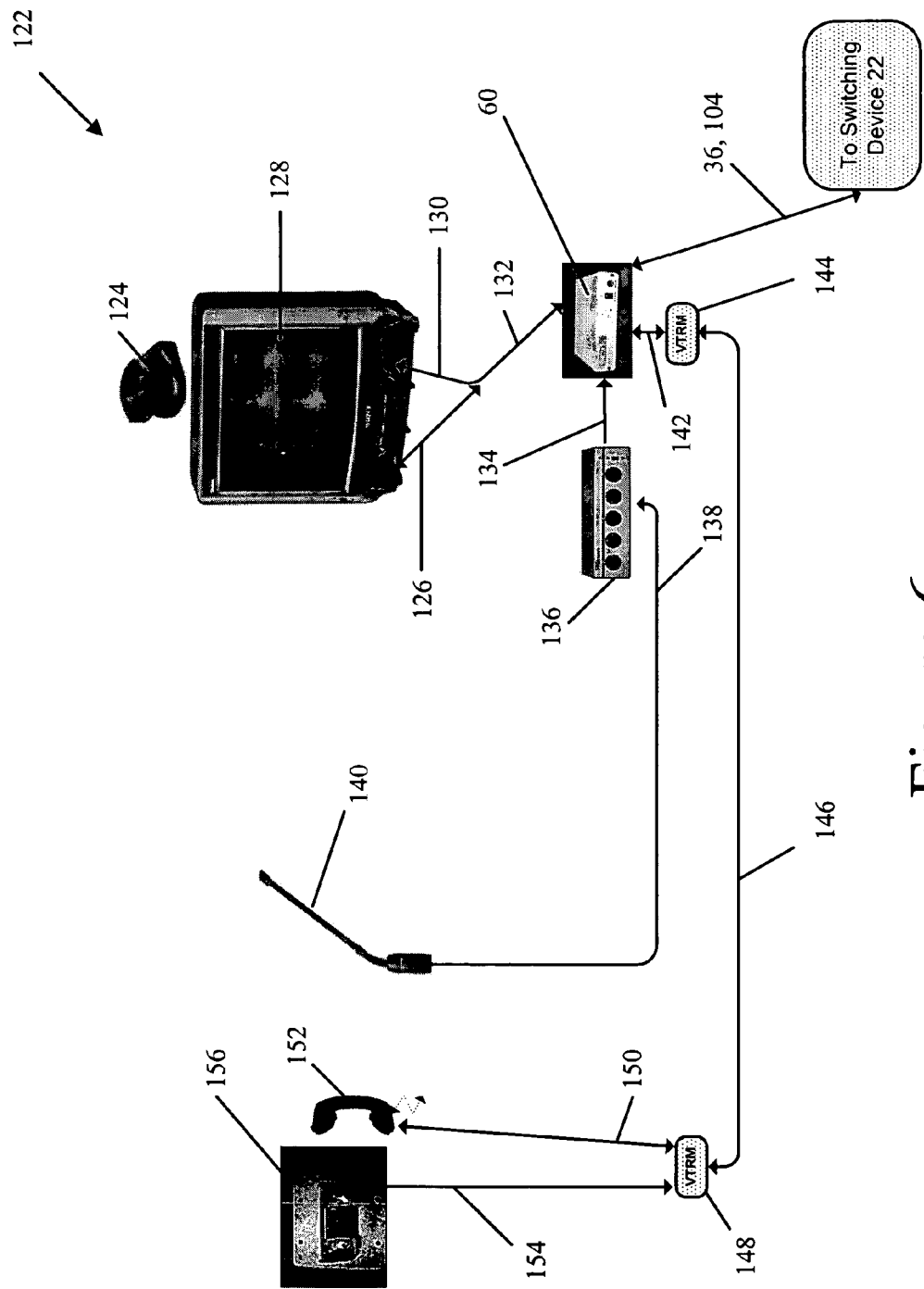
FIG. 6 is a schematic illustration of the connections associated with one embodiment of the inmate attorney-client sidebar station contemplated for use with the system of the present invention.

FIG. 6 illustrates one contemplated arrangement for the inmate attorney-client sidebar station, which is designated 122 for ease of reference. The inmate attorney-client sidebar station 122 may operate in both a public and a privacy mode. In the public mode, the camera 124 generates video signals that capture the image of the inmate sitting in front thereof. The video signals are sent from the camera 124 through the communications link 126 to the jail control interface device 60. Signals from the camera 124 also may be sent to the monitor 128. Typically, however, the monitor 128 receives incoming, court-generated A/V signals from the jail control interface device 60 via the two-way communications link 130. The communications links 126, 130 join to form a common two-way communications link 132 that connects to the jail control interface device 60. The jail control interface device 60 is connected to the switching device 22 via the communications link 36, 104.

The jail control interface device 60 is connected via a one-way communications link 134 to an audio mixer 136. The audio mixer 136 is, in turn, connected to a one-way communications link 138 that transmits audio signals from a microphone 140 located within the inmate conference room 18. The communications links 134, 138 from the microphone 140 to the audio mixer 136 and from the audio mixer 136 to the control interface device 60 preferably are one-way communications links because A/V signals typically are not returned to the microphone 140. Of course, it is possible that the communications links 134, 138 could be two-way links if so desired.

In the privacy mode of operation, the A/V signals from the jail control interface device 60 travel through a two-way communications link 142 to a VTRM 144. From the VTRM 144, along the wired or wireless communications link 146, the A/V signals travel to the VTRM 148, where the signal is routed to an audio handset 152. The VTRM 148 also may be connected, via a one-way communications link 154, to a hook switch 156 associated with the handset 152. If the handset is placed onto the cradle, the hook switch 156 sends a signal that tells the control interface device 60 that the handset 152 has been placed onto the cradle, thereby preventing the inmate and attorney from communicating in a privacy mode.

Figure 7:
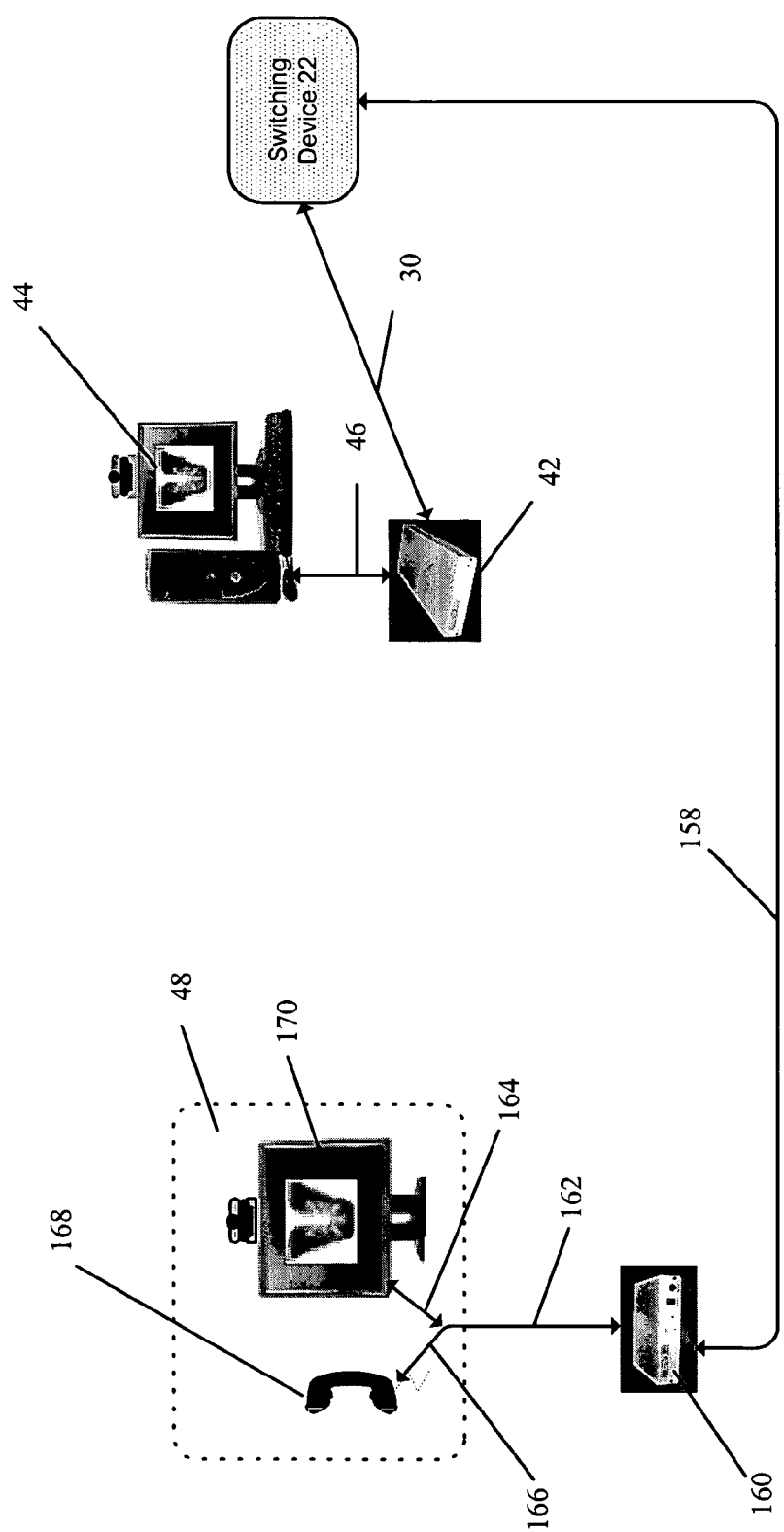
FIG. 7 is a schematic illustration of the connections associated with another embodiment of the courtroom attorney-client sidebar station contemplated for use with the system of the present invention.

FIG. 7 illustrates another possible arrangement contemplated for connecting the judge's control panel 44 to the courtroom attorney-client sidebar station 48. This arrangement is similar to the arrangement illustrated in FIG. 5. Here, however, the courtroom attorney-client sidebar station 48 connects to the judge's control panel 44 via the switching device 22. In this embodiment, the judge's control panel 44 connects to the control interface device 42 via the two-way communications link 46, as illustrated in FIG. 5, for example. The control interface device 42 connects with the switching device 22 via the two-way communications link 30. The switching device 22, in turn, connects, via a two-way communications link 158 to a control interface device 160. A two-way communications link 162 extends from the control interface device 160 to the courtroom attorney-client sidebar station 48. As discussed previously, the courtroom attorney-client sidebar station 48 may operate in a privacy or in a public mode. If operating in a public mode, the A/V signals are generated by the camera/microphone/monitor 170 and travel through the two-way communications link 164. In the privacy mode, the handset 168 is used and the audio signals travel through the two-way communications link 166.

Figure 8:
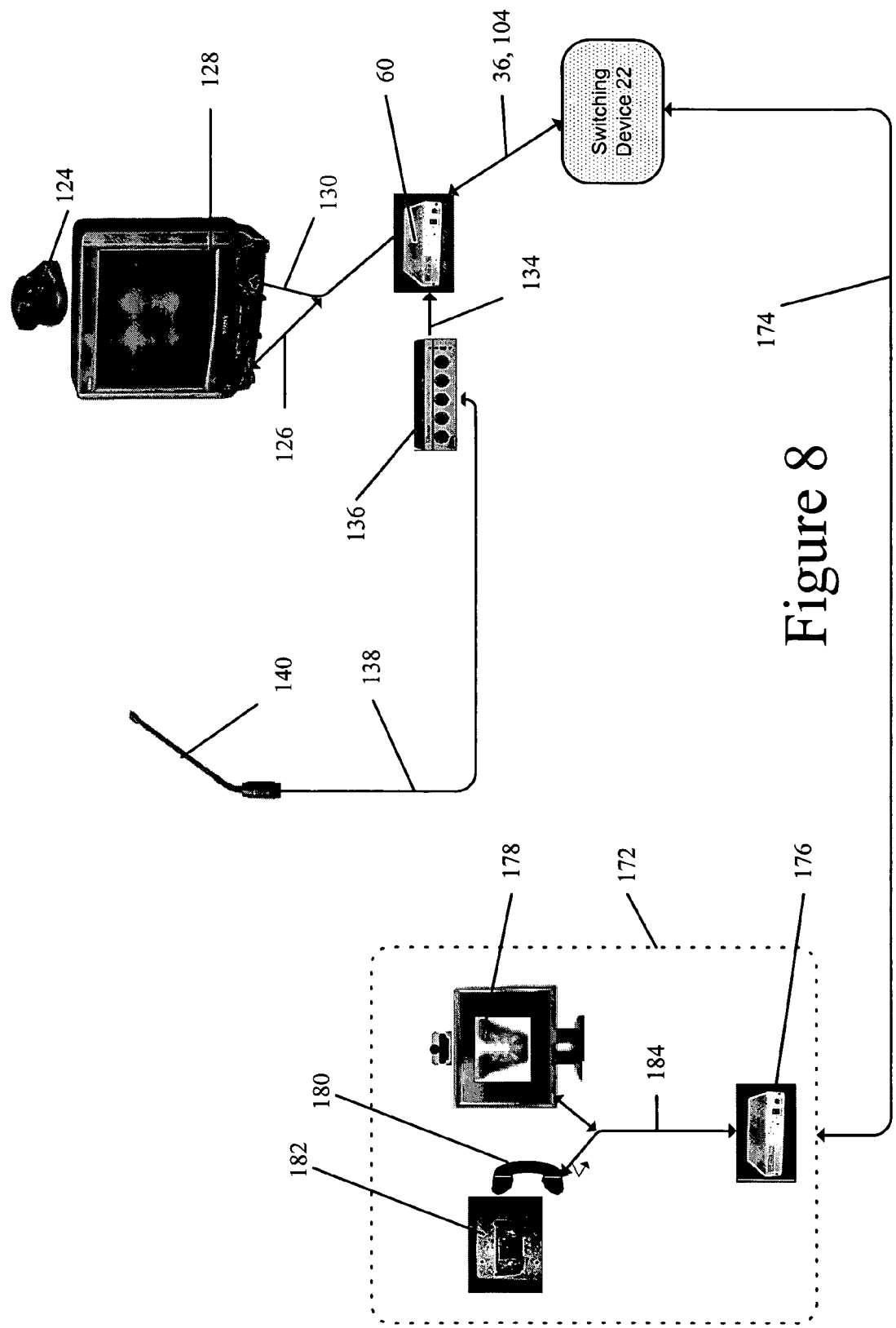
FIG. 8 is a schematic illustration of the connections associated with another embodiment of the inmate attorney-client sidebar station contemplated for use with the system of the present invention.

FIG. 8 illustrates schematically another variation on the setup of componentry at the jail 14. In this arrangement, the inmate attorney-client sidebar station 62 has two parts, one for a privacy mode of operation and another for a public mode of operation. As illustrated, the portion of the inmate attorney-client sidebar station 62 that facilitates public capture and transmission of A/V information is the same as illustrated an described in connection with FIG. 6. Accordingly, discussion of that portion of the system will not be repeated. This embodiment differs in that the inmate attorney-client sidebar station 62 also includes a privacy station 172. The privacy station 172 connects to the switching device 22 via a communications link 174. The communications link 174 connects to a control interface device 176 within the privacy station 172. The privacy station 172 includes a camera and monitor 178, a handset 180, and a hook switch 182, all connected to the control interface device 176 via the two-way communications link 184.

The operation of the system of the present invention will now be described in connection with the figures described above.

Referring again to FIGS. 2A and 2B, information is provided to the system 10, 38 by several input devices including the judge's camera and microphone 64, the prosecutor's camera and microphone 66, the defense attorney's camera and microphone 68, the courtroom camera and microphone 70, the prosecutor's laptop 80, the defense attorney's laptop 84, the VCR/DVD player 88, the document camera 92, and the inmate attorney-client sidebar station 62, among others. Each of these different inputs is controlled by the judge's station 44 so that the information may be displayed in a useful manner on the display devices 96 within the courtroom 16. The judge has complete control over the system 10, 38 in the courtroom 16. Accordingly, the judge may choose the format of the information provided by the display devices 96. In addition, the judge controls the content of the information provided on the display devices 96.

It is contemplated that, where the judge's control panel 44 is a PC, the judge may select, from a menu, the preferred display format for the display devices 96. In one example, the judge may select a format where the prosecuting attorney, the defense, attorney, the inmate, and the judge are simultaneously depicted on the display devices 96. In this manner, not only can the conduct of each of the parties be displayed to the jury, but the conduct of each of the parties may be recorded by the recording device 58.

If the judge selects a display format where several individuals are displayed simultaneously on the display devices 96, the audio signal may be selected based on the person currently speaking or based on other suitable rules. One or more rules may be employed to determine whose voice is projected through the speakers in the courtroom 16.

As would be appreciated by those skilled in the art, whatever image or images are projected on the display devices 96 within the courtroom 16, the same image or images may be transmitted to the inmate and may be displayed to the inmate via the inmate's station 62. Accordingly, the inmate may be aware of all of the activity in the courtroom 16. Of course, as the foregoing discussion makes clear, whatever the inmate sees is at the judge's discretion.

While it is contemplated that the inmate will receive the same A/V information as that presented to the jury in the courtroom 16, other variations are also contemplated. For example, in one embodiment, the inmate may be presented with A/V information that is not presented to the jury. It is contemplated that the inmate be given access to information captured by the courtroom camera and microphone 70. With this type of system, the inmate has access to the overall conduct taking place within the courtroom 16.

Turning to the attorney-client sidebar feature of the system 10, 38 of the present invention, it should be noted that the system 10, 38 includes a defense attorney's camera and microphone 68 and the courtroom attorney-client sidebar station 48. Both are accessible by the defense attorney. The two A/V IO devices are separate from one another and are preferably located in different areas of the courtroom 16. In particular, the defense attorney's camera and microphone 68 preferably are mounted on the defense attorney's table. The courtroom attorney-client station 48, however, preferably is located in the courtroom is a semi-private location, out of earshot from the remaining participants in the courtroom proceeding. Of course, as would be appreciated by those skilled in the art, if appropriate, the courtroom attorney-client sidebar station 48 also may be located at the defense attorney's table. As discussed, the judge has complete control over the system 10 such that the defense attorney and the inmate may not converse with one another without the judge's prior authorization.

If the judge agrees to permit the defense attorney and the inmate to confer about a specific issue protected by the attorney-client privilege, the judge selects the attorney-client sidebar option from a menu provided by the judge's control panel 44. Selection of the attorney-client sidebar option signals the courtroom control interface device 42 to disable collection, processing, and routing of the various A/V inputs available to the system. In addition, activation of the attorney-client sidebar feature initiates a control signal to stop all projection of information to the display devices 96.

When the attorney-client sidebar feature is activated, the courtroom attorney-client sidebar station 48 is activated and the inmate's station 62 is activated such that the inmate may communicate with the defense attorney via a handset 152, 180 provided as a part of the inmate station 62, 172. When the attorney-client sidebar feature is activated, the courtroom station 48 and the inmate's station 62, 172 are the only two A/V IO devices that remain active. No other device connected to the system 10 participates in the attorney-client conversation. All of the devices are "locked out" of the attorney-client privileged communication.

In the preferred set-up of the system 10 of the present invention, the attorney station 48 within the courtroom 16 includes a handset 118, 168 that connects to the courtroom control interface device 42. When the attorney-client sidebar feature is active, the attorney may pick up the handset 118, 168 and speak to the inmate via the handset 118, 168. A video image of the defense attorney is captured separately by a camera (and microphone) system integrated with the attorney station 48.

At the jail 14, the inmate either may continue to communicate with the defense attorney by relying on the camera 124 and microphone 140 incorporated into the inmate station 62, 172. Typically, the inmate may do this if the inmate is alone at the inmate station 62, 172. However, this is rarely the case. Usually, the inmate is being watched by a security guard. As a result, for the inmate to conduct a private conversation with the defense attorney, the inmate is required to use the handset 118, 168 incorporated into the inmate station 62, 172.

The system 10 of the present invention is activated only when the judge permits the attorney-client sidebar using the judge's control panel. Once the attorney-client sidebar feature is activated, the actual communications link between the attorney station 48 and the inmate station 62, 172 is made when the judge activates it. Then, the defense attorney picks the handset 118, 168 up from the receiver in the courtroom 14 and the inmate picks up the handset 152, 180 in the jail 14. The attorney-client sidebar communications link remains active on the communications link until the defense attorney returns the handset 118, 168 to the cradle, notifies the judge that the attorney-client sidebar is complete, and the judge disables the attorney-client sidebar and reasserts control over the proceeding at the court level.

In the preferred embodiment of the system, the inmate does not have control over any part of the operation of the system 10. For example, if the inmate were to return the handset 152, 180 to the hook switch 156, 182 during the attorney-client sidebar conversation, the communications link between the defense attorney and the inmate is not severed at all but merely returns to a public mode of operation at the jail 14. The inmate may have become momentarily, emotionally distressed resulting in the return of the handset 152, 180 to the hook switch 156, 182. After claming down a bit, the inmate may be interested in resuming the attorney-client sidebar function in the privacy mode. The attorney-client sidebar feature of the present invention is deactivated only after the attorney returns the handset 118, 168 to the hook switch and the judge toggles the feature to "OFF" through the judge's control panel 44.

As may be appreciated from the schematic of FIGS. 2A and 2B, among others, when the judge selects the attorney-client sidebar mode of operation, the system 10, 38 uses the established communications link between the courtroom 16 and the jail 14 for the communications link between the attorney's station 48 and the inmate's station 62, 172. At least as far as FIGS. 2A and 2B illustrate, a separate communications connection between the attorney and the inmate is not established. Alternatively, as indicated in FIG. 7, a separate communications link 174 may be established with the switching device 22, again relying on the communication links established by the system 10, 38.

So that the defense attorney may communicate with his client outside of the prying ears of other present in the courtroom 16, it is customary to position the attorney's station 48 in a location where the jury may not see the inmate's reaction to particular advice or commentary. This may require placing the attorney's station 48 in a location outside of the courtroom in circumstances where warranted.

In addition to the embodiments illustrated in FIGS. 1–4, FIGS. 5–8 provide alternative arrangements of the attorney-client sidebar feature of the present invention. These embodiments are meant to be illustrative of the invention only and are not meant to be limiting of the scope of the invention. Moreover, the present invention is intended to encompass a broad subject matter, as evidenced by the claims appended hereto. The embodiments described are but a few examples and should not be construed as the only embodiments encompassed by the present invention.

What is claimed is:

1. A conference system, comprising:
   a communications link coupling a first location to a second location;
   a first input-output device disposed at the first location, generating a signal from an attorney;
   a second input-output device disposed at the second location, generating a signal from the attorney's client, the attorney and the client having a relationship protected by the attorney-client privilege;
   a third input-output device disposed at the first location, generating a signal from a third party;
   a signal processor disposed in the communications link between the first and second locations, the signal processor routing the signals between the input-output devices at the first and second locations; and
   a control panel operatively coupled to the signal processor, providing control over the signals routed thereby;
   wherein the communications link communicatively couples the first, second and third input-output devices to one another, such that each of the input-output devices is configured to receive and play signals from the others of the input-output devices, and
   wherein the control panel also controls the input-output devices so that a private communication may be established between the first and second input-output devices, at the exclusion of the third input-output device, such that the signals generated by the first and second input-output devices are maintained in confidence and such that the attorney and the attorney's client are permitted to engage in a private communication without vitiating the attorney-client privilege.

2. The system of claim 1, wherein the communications link establishes a point-to-point conference between the first and second locations.

3. The system of claim 1, wherein the signals comprise at least audio and video components.

4. The system of claim 1, further comprising a control interface device disposed in the communications link,
   wherein the control interface device is communicatively coupled between the first input-output device and the signal processor, and
   wherein the signal processor is communicatively coupled between the control interface device and the second input-output device, and
   wherein the control panel is operatively coupled to the control interface device.

5. The system of claim 1, further comprising first and second control interface devices disposed in the communications link between the first and second input-output devices,
   wherein the first input-output device is communicatively coupled to the first control interface device,
   wherein the first control interface device is communicatively coupled between the first input-output device and the signal processor,
   wherein the signal processor is communicatively coupled between the second control interface and the second input-output device, and
   wherein the control panel is operatively coupled to the second control interface.

6. The system of claim 1, further comprising a control interface device disposed in the communications link, communicatively coupled between the signal processor and the second input-output device.

7. The system of claim 1, further comprising first and second control interface devices disposed in the communications link, operatively coupled between the first and second input-output devices,
   wherein the second input-output device is communicatively coupled to the first control interface device,
   wherein the first control interface device is communicatively coupled between the second input-output device and the signal processor, and
   wherein the signal processor is communicatively coupled between the second control interface and the second input-output device.

8. The system of claim 1, wherein the first input-output device is disposed within a courtroom and the second input-output device is disposed within a jail.

9. The system of claim 8, further comprising at least one display device disposed within the courtroom, capable of playing the signals generated by the input-output devices.

10. The system of claim 1, wherein, along at least a portion thereof, the communications link comprises at least one selected from a wired connection, a wireless connection, a network connection, and the Internet.

11. The system of claim 1, wherein the control panel is configured to be controlled by a judge.

12. The system of claim 1, wherein the attorney is a defense attorney and the attorney's client is a jail inmate.

13. The system of claim 12, wherein the first input-output device is configured to capture audio-visual information from the defense attorney and the second input-output device is configured to capture audio-visual information from the jail inmate during a trial proceeding.

14. The system of claim 12, wherein the third input-output device is configured to capture audio-visual information from a prosecuting attorney during a trial proceeding.

15. The system of claim 12, further comprising a fourth input-output device configured to capture audio-visual information from a judge overseeing a trial proceeding.

16. The system of claim 1, further comprising a display device communicatively coupled to the signal processor to display information generated by the input-output devices.

17. The system of claim 16, further comprising a plurality of input devices communicatively coupled to the communications link, wherein the plurality of input devices are configured to interject audio-visual information for play on the at least one display device during the trial proceeding.

18. The system of claim 17, wherein the plurality of input devices comprises at least one selected from a group comprising a computer, a video cassette recorder, a digital video disk recorder, a memory device, an audio recorder, and a document camera.

19. The system of claim 1, wherein the control panel comprises one selected from a group comprising a personal computer, a telephone handset, a touchpad device, a touchscreen device, and a keypad device.

20. The system of claim 1, wherein the signal processor is a switching device.

21. The system of claim 1, wherein the first input-output device comprises a first privacy handset and the second input-output device comprises a second privacy handset, wherein the handsets permit the attorney and client to engage in a private communication without vitiating the attorney-client privilege.

22. An audio-video conferencing method between a courtroom and a jail, comprising:
   providing a first input-output device in the courtroom to capture information from an attorney during a trial and generate an attorney audio-visual signal;
   providing a second input-output device in the jail to capture information from an inmate during a trial and generate an inmate audio-visual signal;
   providing a third input-output device in the courtroom to capture information from another participant during trial and generate a third party audio-visual signal;
   communicatively coupling the first, second, and third input-output device to one another;
   controlling the audio-visual signals communicated from the courtroom to the jail with a signal processor; and
   operatively coupling a control panel, controlled by a judge, to the signal processor;
   wherein, when the attorney wishes to conduct an attorney-client privileged communication with the inmate, the judge selects an attorney-client sidebar function via the control panel,
   wherein, after initiating the attorney-client sidebar feature, the first and second input-output devices communicate with one another, to the exclusion of the third input-output device, thereby permitting the attorney and client to engage in an attorney-client communication without vitiating the attorney-client privilege.

23. A conference system, comprising:
   a communications link coupling a first location to a second location;
   a first input-output device disposed at the first location, generating a signal from an first party;
   a second input-output device disposed at the second location, generating a signal from a second party;
   a third input-output device disposed at one of either the first and second locations, generating a signal from a third party;
   a signal processor disposed in the communications link between the first and second locations, the signal processor routing the signals between the input-output devices at the first and second locations; and
   a control panel operatively coupled to the signal processor, providing control over the signals routed thereby;
   wherein the communications link communicatively couples the first, second and third input-output devices to one another, such that each of the input-output devices is configured to receive and play signals from the others of the input-output devices, and
   wherein the control panel also controls the input-output devices so that a private communication may be established between the first and second input-output devices, at the exclusion of the third input-output device, such that the signals generated by the first and second input-output devices are maintained in confidence.

* * * * *